(No Model.)
E. RIVETT.
TOOL HOLDER AND REST THEREFOR.
No. 535,021. Patented Mar. 5, 1895.
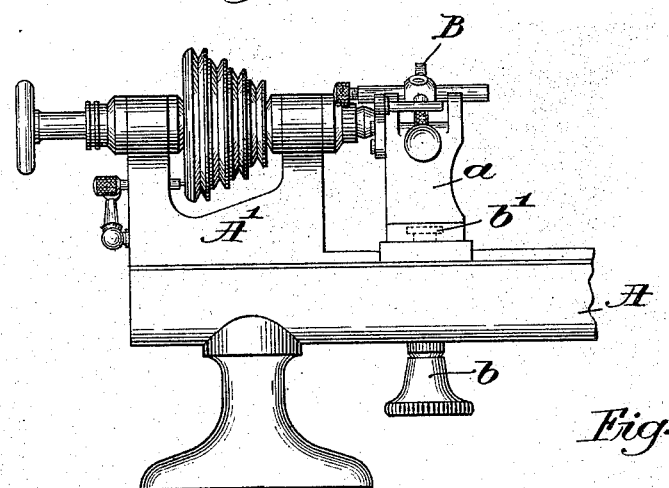
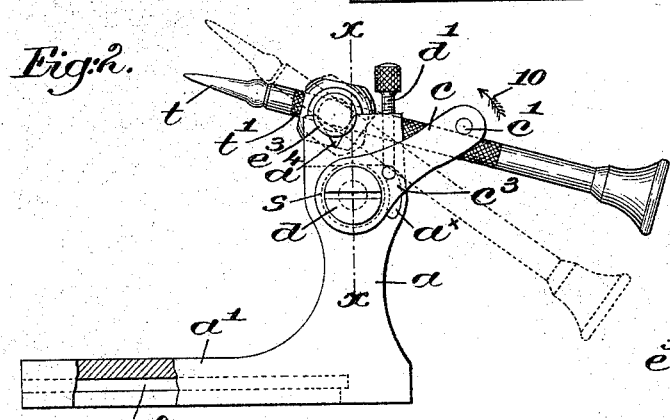
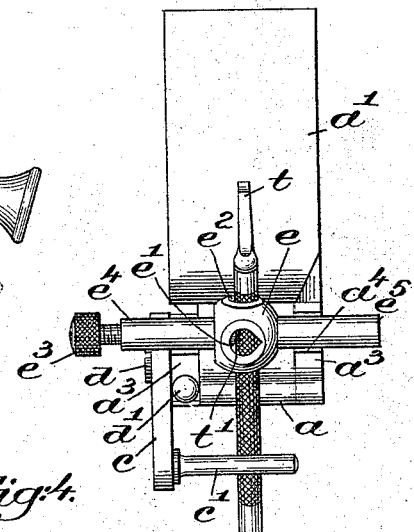
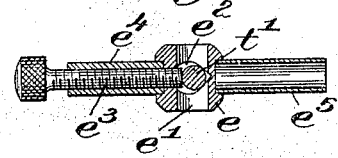
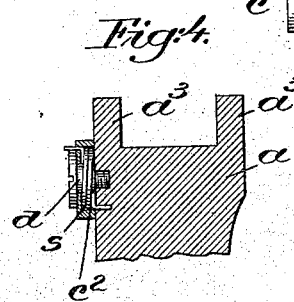
Witnesses.
A. C. Harmon
Thomas J. Drummond.
Inventor
Edward Rivett,
by Crosby & Gregory attys.

UNITED STATES PATENT OFFICE.

EDWARD RIVETT, OF BOSTON, MASSACHUSETTS.

TOOL-HOLDER AND REST THEREFOR.

SPECIFICATION forming part of Letters Patent No. 535,021, dated March 5, 1895.

Application filed June 18, 1894. Serial No. 514,927. (No model.)

*To all whom it may concern:*

Be it known that I, EDWARD RIVETT, of Boston, county of Suffolk, State of Massachusetts, have invented an Improvement in Tool-Holders and Rests Therefor, of which the following description, in connection with the accompanying drawings, is a specification, like letters on the drawings representing like parts.

This invention has for its object the production of a tool holder to receive a tool to be ground, and a rest for the holder, whereby the tool is held in proper position with relation to the face of the grinding wheel, to insure the grinding of a perfectly true face on the tool and to prevent scoring or marring of the wheel.

The apparatus to be hereinafter described is particularly adapted for watchmakers' use, especially for grinding screw drivers to produce a thin, straight edge, and my invention consists in the features of construction hereinafter specifically described and particularly pointed out in the claims.

Figure 1 in side elevation represents a sufficient portion of a lathe to be understood, with my invention applied thereto. Fig. 2 in elevation and partly broken away shows the tool holder and rest embodying my invention, on a larger scale, with a tool in the holder. Fig. 3 is a top view of the holder and rest shown in Fig. 2. Fig. 4 is a cross sectional view of Fig. 2, taken on the line $x$—$x$; and Fig. 5 is a longitudinal sectional view of the tool-holder.

The lathe bed A, head A' and grinding wheel B secured to the arbor are and may be of any desired or well known construction, the lathe partly shown in Fig. 1 being known as the "Crosby" lathe.

Instead of the usual tool rest, I have herein shown a tool rest composed of an upright or standard $a$ having an extended base $a'$, provided with an interior undercut longitudinal groove $a^2$, shown only in Fig. 2, to receive the head $b'$, see dotted lines Fig. 1, of the usual clamp $b$, by which the rest is held in adjusted position upon the lathe bed A.

The rest and its base are preferably made integral and sufficiently heavy and strong to afford a firm support for the tool to be ground, and the standard $a$ is provided at its top with ears $a^3$ having preferably V-shaped notches $a^4$ therein to form open bearings for the tool-holder, to be described. An arm $c$ is pivotally supported at one side of the standard on a stud $d$, shown as a screw, the outer end of the arm being provided with a guard, shown as a pin or stud $c'$ secured thereto at right angles, while the inner end of the arm is recessed at $c^2$ to receive therein a coiled spring $s$, best shown in Fig. 4, one end of the spring being secured to the arm and the other end to the standard. The spring is so coiled that normally it tends to move the arm on its pivot or stud $d$ in the direction of the arrow 10, Fig. 2.

A curved recess $a^\times$ concentric to the stud $d$ is made in the side of the standard $a$, in which plays a lug or projection $c^3$ on the inner side of the arm $c$, said lug or projection being engaged by the inner end of an adjusting screw $d'$ longitudinally movable in a threaded opening in the standard intersecting the recess $a^\times$. Rotation of the adjusting screw into the standard causes its inner end to act upon and depress the projection $c^3$, and thereby turns the arm $c$ in the opposite direction to the arrow 10, lowering the guard $c'$, for a purpose to be described.

The tool-holder as herein shown consists of a body portion $e$ having intersecting openings $e'$ and $e^2$ therethrough, at right angles to each other and to the longitudinal axis of the holder, and preferably of different diameters, the shank or handle $t'$ of the tool $t$ being passed through one or the other of said openings, according to its size, and clamped therein by a set screw $e^3$, located in the longitudinal axis of the holder. The body portion has secured thereto or forming a part of it cylindrical journals $e^4$, $e^5$, one of them, as $e^4$, being internally threaded to form a bearing for the set screw $e^3$, as best shown in Fig. 5, the journals being adapted to rest loosely in the bearings $a^4$ of the standard $a$, and of sufficient length to permit longitudinal movement of the holder therein, the shape of the bearings reducing friction.

When it is desired to grind a tool, as for instance, a screw driver $t$, the tool is clamped in the holder as described, and the latter is placed on the rest with its journals $e^4$ and $e^5$ resting in the bearings $a^4$ of the standard, as shown in Figs. 1 to 3. When the rest has been clamped in position in front of the grinding wheel B by means of the set screw or clamp b the edge of the tool is laid against the face of the wheel, which is rotated in the usual manner. The guard c' projects above the shank or handle t' of the tool, as shown, and prevents improper depression of the edge of the tool, the guard being adjusted to the proper height according to the diameter of the wheel and the character of the tool, by means of the screw d'. By depressing the handle the tool is raised from the wheel from time to time as the grinding progresses, as shown in dotted lines Fig. 2.

If a screw driver is being ground, the holder may be reversed by turning it over and reversing the journals in their bearings, so that after one face of the tool has been ground the other face can be applied to the wheel, and if the tool has not been clamped in the holder with perfect accuracy the edge will nevertheless be ground perfectly true.

The holder and tool may be moved across the face of the wheel by means of the long journals of the holder, so that furrows will not be made in the wheel, and the guard c' prevents the tool from being depressed sufficiently to turn its edge or to score the wheel face.

A tool may be quickly removed from or placed in the holder, and the entire apparatus is simple in construction, strong, and durable, and most effective in operation.

My invention is not restricted to the exact construction herein shown, and while it is particularly adapted for watchmakers' use it is not restricted thereto, as it is obvious that it may be used with equal effect for other purposes whenever it is desired to control the movement of the tool relative to the grinding wheel.

I claim—

1. A rest having open bearings, and a guard adjustably supported on the rest, combined with a holder for the tool, elongated journals for the holder adapted to rest in said bearings, whereby the holder may be moved laterally in the bearings, the shank or handle of the tool projecting under the guard and being limited thereby in its rotative movement, substantially as described.

2. A holder for the tool to be operated upon, journals for said holder, and a clamping device extended through one of said journals to clamp the tool in place, combined with a rest having open bearings for the journals, an adjustable guard supported on the rest and adapted to limit the rotative movement of the holder, and means to retain the guard in adjusted position, substantially as described.

3. A holder having an opening therein intersecting its longitudinal axis and through which the tool is extended, and journals for the holder in said axis, combined with a rest having bearings for said journals, a spring-actuated guard on the rest to act upon the handle or shank of the tool at the rear of the bearings and limit the rotative movement of the holder and the downward movement of the tool edge, and an adjusting device to depress the guard positively against the action of the spring, substantially as described.

4. A holder consisting of a body portion having an opening therein intersecting and at right angles to its longitudinal axis, through which opening the tool is extended, a set screw entering said opening to clamp the tool therein, and laterally extended journals secured to the holder, combined with a rest having bearings for said journals, to pivotally support the holder, substantially as described.

In testimony whereof I have signed my name to this specification in the presence of two subscribing witnesses.

EDWARD RIVETT.

Witnesses:
JOHN C. EDWARDS,
FREDERICK L. EMERY.